United States Patent [19] [11] 4,098,520
Ezaki et al. [45] Jul. 4, 1978

[54] PROTECTIVE FRAME STRUCTURE FOR AN AUTOMOBILE GAS TANK

[75] Inventors: Toshi Ezaki; Masanobu Tsutsumi, both of Toyota, Japan

[73] Assignee: Toyota Jidosha Kogyo Kabushiki Kaisha, Toyota, Japan

[21] Appl. No.: 727,028

[22] Filed: Sep. 27, 1976

[30] Foreign Application Priority Data

Jul. 26, 1976 [JP] Japan .............................. 51-99469[U]

[51] Int. Cl.² ........................................... B62M 27/00
[52] U.S. Cl. ................................... 280/784; 180/5 A; 296/1 C
[58] Field of Search ....................... 280/106 X, 106 R; 296/1 C; 180/5 A

[56] References Cited

U.S. PATENT DOCUMENTS 3,860,258  1/1975  Feustel et al. .................. 280/106 R Primary Examiner—Richard A. Bertsch
Attorney, Agent, or Firm—Koda and Androlia

[57] ABSTRACT

A protective frame structure for a motor vehicle gas tank including a pair of frame side members extending longitudinally along the sides of the gas tank, a pair of frame crossing members disposed in front of and rear of the gas tank, a protective crossing member having no corners disposed between the gas tank and the rear frame crossing member and a shock absorber means disposed between the gas tank and the front frame crossing member whereby the gas tank is protected from being either punctured or burst in a rear end or front end collision by said protective crossing member and said shock absorber means.

7 Claims, 6 Drawing Figures

PROTECTIVE FRAME STRUCTURE FOR AN AUTOMOBILE GAS TANK

BACKGROUND OF THE INVENTION

1. Field of Invention

This invention relates to safety devices for motor vehicles and more particularly to safety devices for protecting the gas tank of a motor vehicle.

2. Prior Art

With higher and higher traffic speeds and the need for more and more protection, it has become necessary to provide a means for protecting the gas tank of a motor vehicle. A variety of protective means have been developed to protect gas tanks to prevent the gasoline from escaping from the tank during an automobile collision. One such example is to place a resilient liquid proof bladder inside the gas tank. Such bladders prevent the gasoline from leaking from the tank during accidents but are extremely expensive to manufacture and install. Another means for protecting a gas tank is by placing a frame around the gas tank. The frame basically comprises a pair of side members which are reinforced by crossing members which are located both in front and in back of the gas tank which is fixed to the frame. In this manner, the gas tank is held by a pair of side members extending along the side of the tank and by a pair of front and back crossing members thereby increasing the protection provided the gas tank during a collision. However, such a structure suffers from drawbacks such as the tank will be damaged by a broken or bent rear crossing member when the motor vehicle is struck from behind by another car or that the gas tank will be pushed forward into one of the corners of the front crossing member causing the tank to be punctured or to be ruptured when the motor vehicle runs into the rear of another motor vehicle.

Accordingly, it is the general object of the present invention to provide a protective frame structure for an automobile gas tank which overcomes the drawbacks mentioned above.

SUMMARY OF THE INVENTION

Accordingly, it is the general object of the present invention to provide a protective frame structure for an automobile gas tank which prevents the gas tank from being punctured or ruptured during a rear end collision.

It is another object of the present invention to provide a protective frame structure for an automobile gas tank which prevents the gas tank from being ruptured or punctured during a front end collision with another automobile.

It is yet another object of the present invention to provide a protective frame structure for an automobile gas tank which is easy to manufacture and inexpensive.

In keeping with the principles of the present invention, the objects are accomplished by a unique protective frame structure for an automobile gas tank including a pair of frame side members extending longitudinally along the sides of the gas tank, a pair of frame crossing members disposed in front of and rear of the gas tank and extending between the pair of frame side members, a protective crossing member extending between the pair of side members and disposed between the gas tank and the rear frame crossing member and a shock absorbing means disposed between the gas tank and the front crossing member. The protective crossing member is arranged and configured such that it presents no corners to the gas tank. Accordingly, this construction protects the gas tank from being punctured or ruptured in an automobile collision.

BRIEF DESCRIPTION OF THE DRAWINGS

The above mentioned and other features and objects of the present invention will become more apparent by reference to the following description taken in conjunction with the accompanying drawings, wherein like referenced numerals denote like elements, and in which.

DETAILED DESCRIPTION OF THE INVENTION

Figure 1:
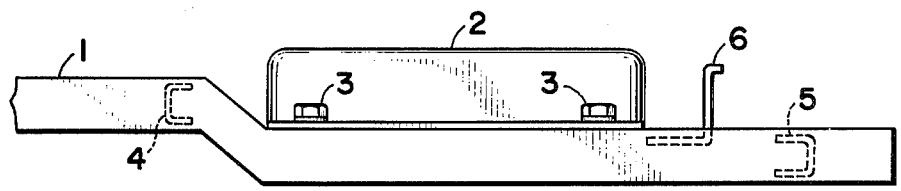
FIG. 1 shows a side view of one embodiment of a protective frame structure for an automobile gas tank in accordance with the teachings of the present invention.
Figure 2:
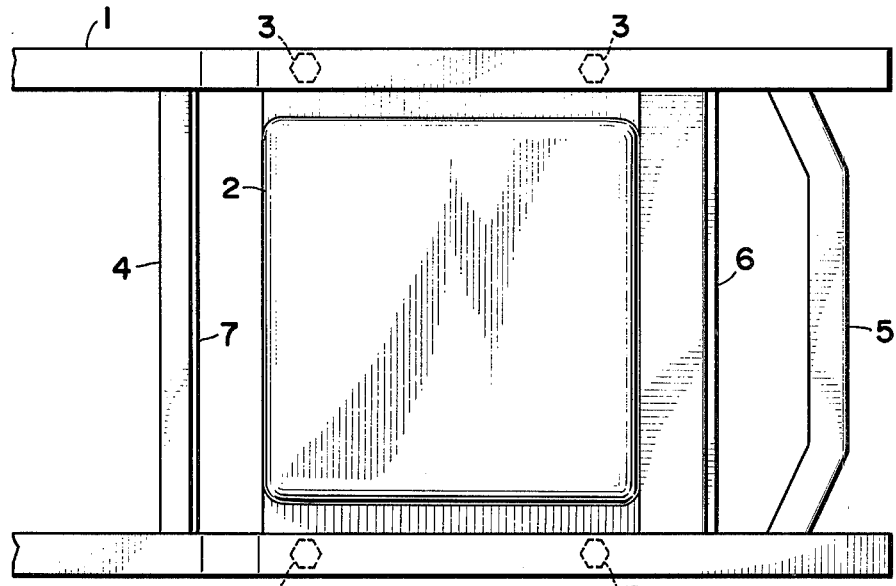
FIG. 2 shows a bottom view of the embodiment of FIG. 1.

Referring more particularly to the drawings, shown in FIGS. 1 and 2 is respectively a side view and a bottom view of a protective frame structure for an automobile gas tank in accordance with the teachings of the present invention. The protective frame structure comprises a pair of side members 1 extending longitudinally within the motor vehicle (not shown). A gas tank 2 is fixed to the rear portion of the side members 1 by means of bolts 3. In the front of and rear of tank 2 are disposed a front frame crossing member 4 and a rear frame crossing member 5. Front and rear frame crossing members 4 and 5 extend between side members 1 and are affixed thereto. Between the tank 2 and the rear crossing member 5, a protective crossing member 6 is disposed. The protective crossing member 6 extends between the side members 1 and is affixed thereto by means of welding.

Figure 3:
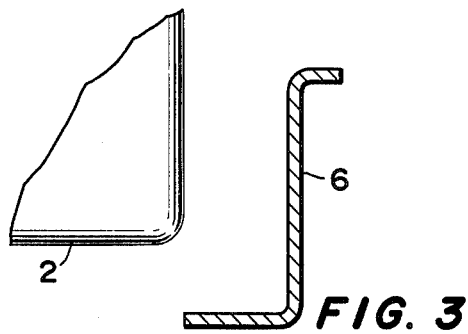
FIG. 3 shows an enlarged cross-sectional view of the protective crossing member of FIG. 1.
Figure 4:
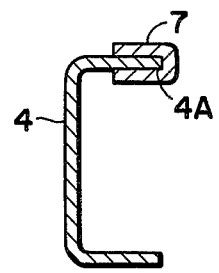
FIG. 4 shows an enlarged cross-sectional view of the front frame crossing member of the embodiment of FIG. 1.

The protective crossing member 6 has a cross-section, as shown enlarged in FIG. 3, of substantially a reversed "L" shape which complies with the configuration of the lower portion of tank 2. The top portion of protective crossing member 6 is bent backward in a round curve thereby forming a round corner.

The front frame crossing member 4 is substantially "C" shaped with its edge 4A facing the tank 2. In order to reduce the possible damage to tank 2 during collisions, a shock absorber means 7 made from a hard resilient material such as a plastic resin is applied to frame crossing member 4 along the edge 4A thereof.

In operation, in the protective structure disclosed above, the protective crossing member 6 will protect the tank 2 from the rear frame crossing member 5 if it is broken or bent during an accident in which the motor vehicle is hit from behind. Even when the rear frame crossing member 5 pushes the protective crossing member 6 forward against the tank 2, the third crossing member 6 being flat and not having any corners will not cause much damage to the tank 2. Furthermore, in the event the tank 2 is shifted forward by the pressure of rear frame crossing member 5, the shock absorbing means 7 would protect the tank 2 from the edge 4A of front crossing member 4.

Figure 5:
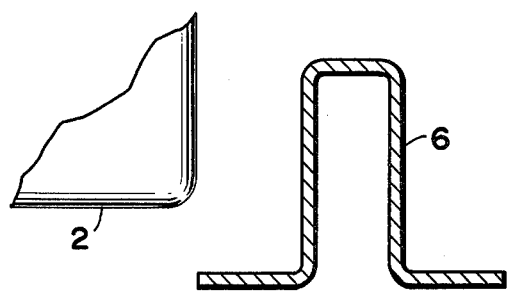
FIG. 5 shows a cross-sectional view of a second embodiment of a protective crossing member.

Referring to FIG. 5, shown therein is a second embodiment of the protective crossing member 6. The protective crossing member 6 shown in FIG. 5 is generally of "U" shape and is disposed between the frame members 1 in substantially the same manner as that previously described.

Figure 6:
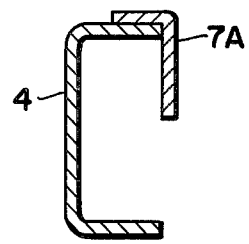
FIG. 6 shows a cross-sectional view of a second embodiment of an absorbing means in accordance with the teachings of the present invention.

Referring to FIG. 6, shown therein is a second embodiment of the shock absorber means shown in cross-section. In the second embodiment of FIG. 6, the shock absorber means is a right angle shaped plate 7A made of a metal such as steel or iron which covers the edge 4A of front frame crossing member 4.

According to this invention, the protective cross member 6 protects the tank by blocking or absorbing the shock from a broken or bent rear frame crossing member 5 and will disburse the stress caused by a collision. Furthermore, when the tank is shifted forward and caused to run against the front frame crossing member 4, the shock absorber means 7 will reduce the force applied to the tank and protect the tank 2. Furthermore, the addition of the protective crossing member 6 and the plate 7A prevents the side members 1 from being dislocated sideways and increases the structural rigidity of the frame.

In all cases it is understood that the above described embodiments are merely illustrative of but a small member of the many possible specific embodiments which can represent application of the principles of the present invention. Numerous and varied other arrangements can be readily devised in accordance with these principles by those skilled in the art without departing from the spirit and scope of the invention.

I claim:

1. A protective frame structure for a motor vehicle gas tank comprising:
   a pair of frame side members extending longitudinally along the sides of said gas tank and coupled to said gas tank;
   a pair of frame crossing members disposed in front of and rear of said gas tank, said pair of frame crossing members being coupled at each end to said frame side members;
   a protective crossing member disposed between the rear of said gas tank and said rear frame crossing member, said protective crossing member having no corners adjacent said gas tank; and
   a shock absorber means disposed between said gas tank and said front frame crossing member.

2. A protective frame structure according to claim 1 wherein said protective crossing member is of generally "L" shaped cross-section.

3. A protective frame structure according to claim 2 wherein said shock absorber means comprises a resilient material disposed on said front frame member.

4. A protective frame structure according to claim 2 wherein said shock absorber means comprises a length of metal having a right angle cross-section.

5. A protective frame structure according to claim 1 wherein said protective crossing member is generally of an inverted "U" shaped cross-section.

6. A protective frame structure according to claim 5 wherein said shock absorber means comprises a resilient material disposed on said front frame member.

7. A protective frame structure according to claim 5 wherein said shock absorber means comprises a length of metal having a right angle cross-section.

* * * * *